Oct. 30, 1962  L. S. HAMER  3,061,267
PLUG VALVE
Filed Feb. 19, 1959  3 Sheets-Sheet 1
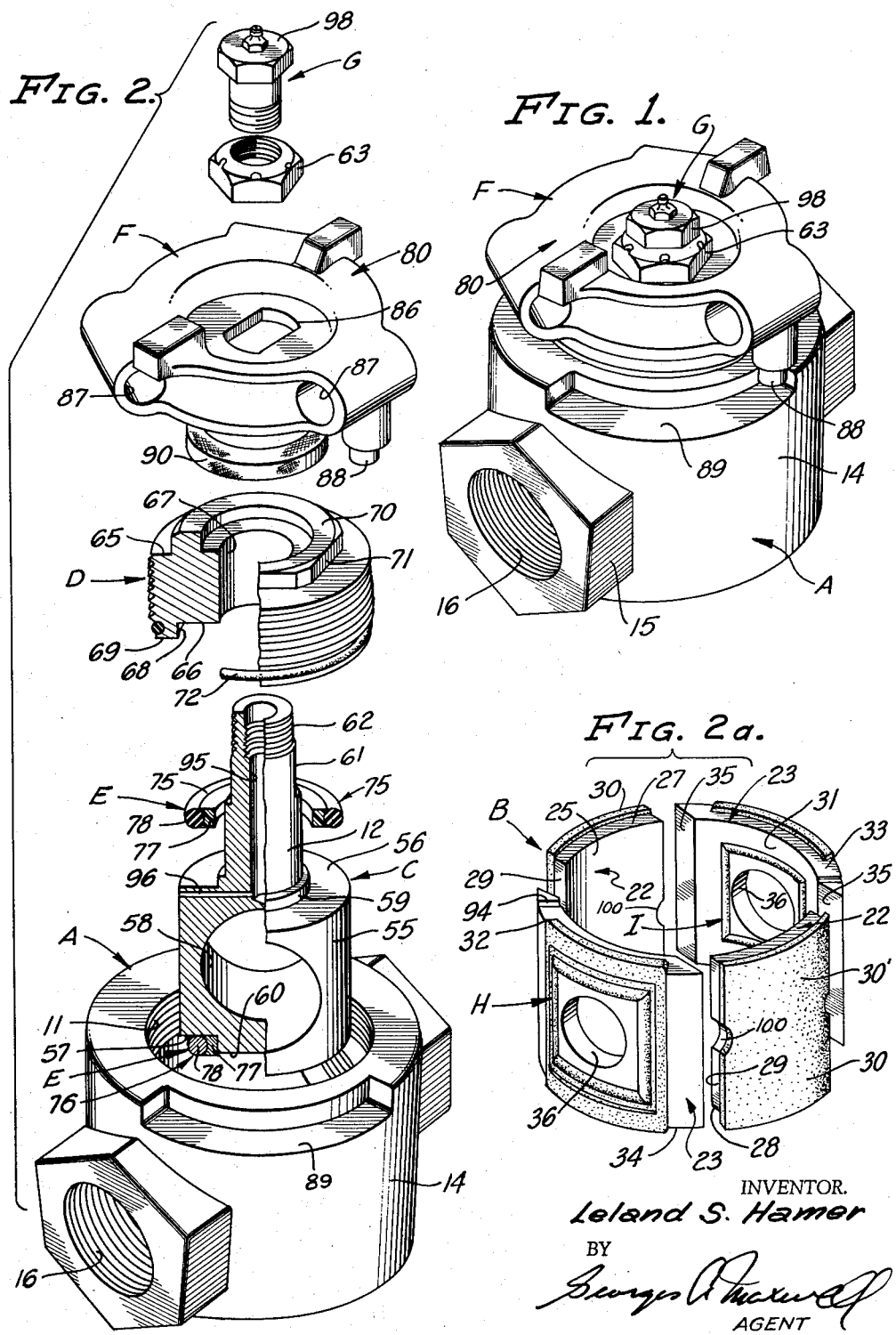
INVENTOR.
Leland S. Hamer
BY
AGENT Oct. 30, 1962 L. S. HAMER 3,061,267
PLUG VALVE
Filed Feb. 19, 1959 3 Sheets-Sheet 2

INVENTOR.
Leland S. Hamer
BY
AGENT

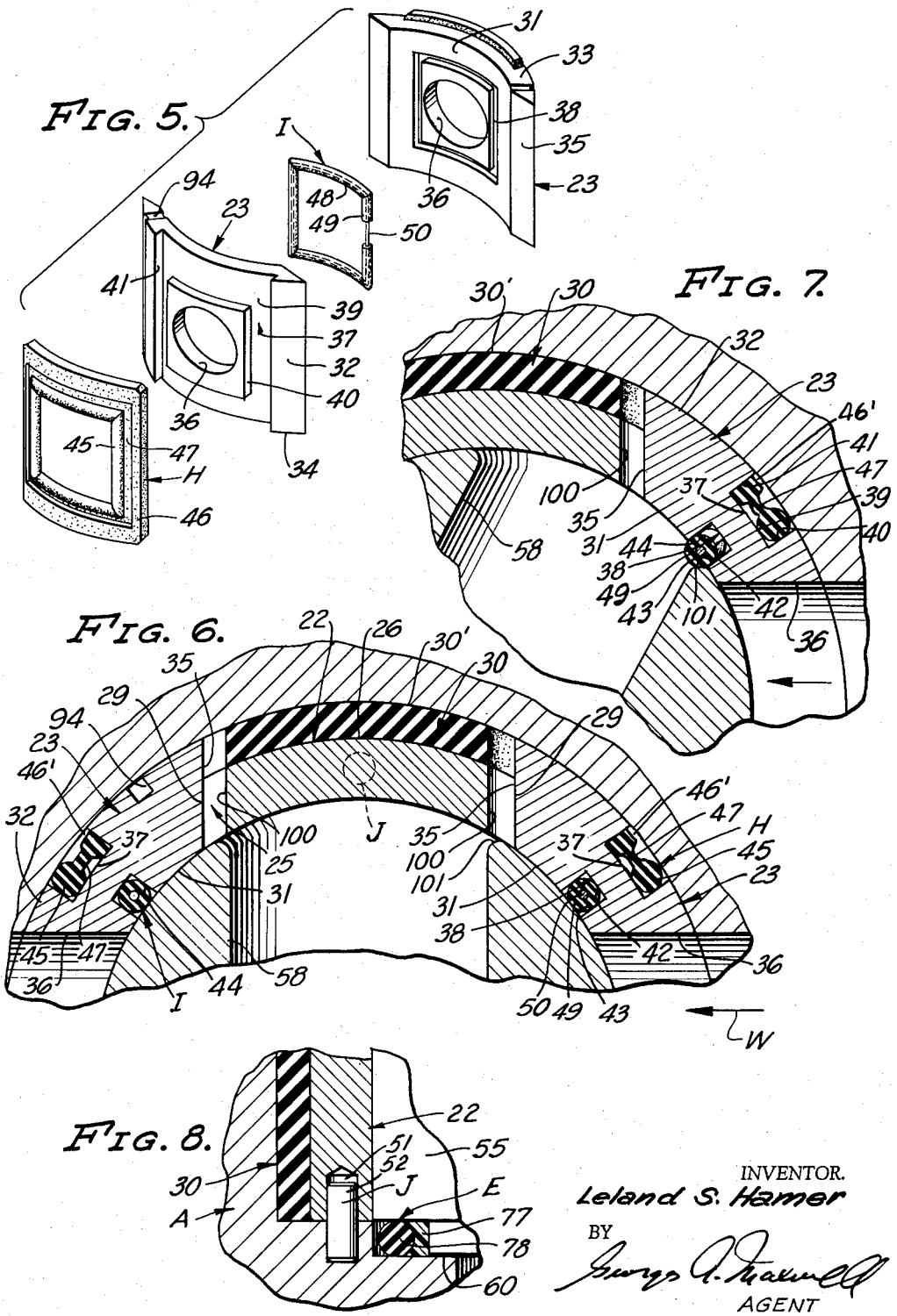

United States Patent Office 3,061,267
Patented Oct. 30, 1962

3,061,267
PLUG VALVE
Leland S. Hamer, Long Beach, Calif., assignor, by mesne assignments, to F.M.C. Corporation, San Jose, Calif., a corporation of Delaware
Filed Feb. 19, 1959, Ser. No. 794,331
13 Claims. (Cl. 251—172)

The present invention relates to a novel plug valve construction.

An object of the invention is to provide a plug valve involving a body with a flow passage extending therethrough, a ported plug rotatably engaged in the body and intersecting the flow passage and a segmental seat assembly in the body and surrounding the plug.

Another object of the present invention is to provide a valve construction of the character referred to having novel sealing means between the plug and the segments of the seat assembly.

A further object of my invention is to provide novel sealing means between the segments of the seat assembly and the body.

An object of the invention is to provide novel valve construction of the character referred to having a straight, cylindrical plug and a segmental seat assembly yieldingly engaged thereabout and in such a manner that the plug cannot stick and in such a manner that foreign matter cannot enter between the plug and the seat.

It is an object of the invention to provide a valve construction of the character referred to wherein the segmental seat assembly can be set in predetermined pressure engagement with the plug to control the turning torque required to operate the valve.

A further object of my invention is to provide a valve of the character referred to wherein the fluid seals between the plug, the segmental seat assembly, and the body are energized only at the downstream side of the plug about the flow passage in the body, with the result that expansion of the body resulting from increase in line pressure but within the elastic limit of the material of which the body is formed will not affect the efficiency of the valve.

Another object of the invention is to provide a valve of the character referred to wherein the parts and portions of the plug and segmental seat assembly which are upstream of the plug-to-segment and segment-to-body seals, are exposed to line pressure and are therefore in equilibrium in and unaffected by said line pressure.

A further object of the invention is to provide a valve of the character referred to wherein the plug is provided with means at its opposite ends to communicate with the atmosphere and so that it is not adversely affected and urged out of position by the fluid pressure within the valve.

It is another object to provide a valve with a lubricating means for advantageously packing the interior thereof with grease, or the like.

Another object of the invention is to provide a plug valve construction of the character referred to which requires no adjustment and which is smaller, lighter and stronger than previous valves of corresponding capacity.

It is a further object of the invention to provide a valve of the character referred to which is easy and economical to manufacture and that can be easily and quickly overhauled without removing it from the pipe in which it is engaged and without the use of special tools and/or skill.

It is a general object of the invention to provide such a valve which is neat and compact, durable and both highly effective and dependable in operation.

The instant application is a continuation-in-part of my co-pending application for Letters Patent entitled, Valve, Serial No. 752,922, filed August 4, 1958, now abandoned.

Other objects and features of the invention will become apparent from the following detailed description of a typical form and application of the invention and the accompanying drawings, in which:

FIG. 1 is a perspective view of the valve construction of the invention.

FIGS. 2 and 2a are an exploded perspective illustration of the plug valve of the present invention.

FIG. 5 is an exploded perspective of a pair of segments and the sealing means related thereto.

FIG. 6 is a fragmentary transverse sectional view taken on line 4—4 of FIG. 3 drawn to a larger scale than that used in FIG. 4.

FIG. 7 is a view similar to a portion of FIG. 6 and showing the elements in a different position.

FIG. 8 is a sectional view taken as indicated by line 8—8 on FIG. 3.

Figure 3:
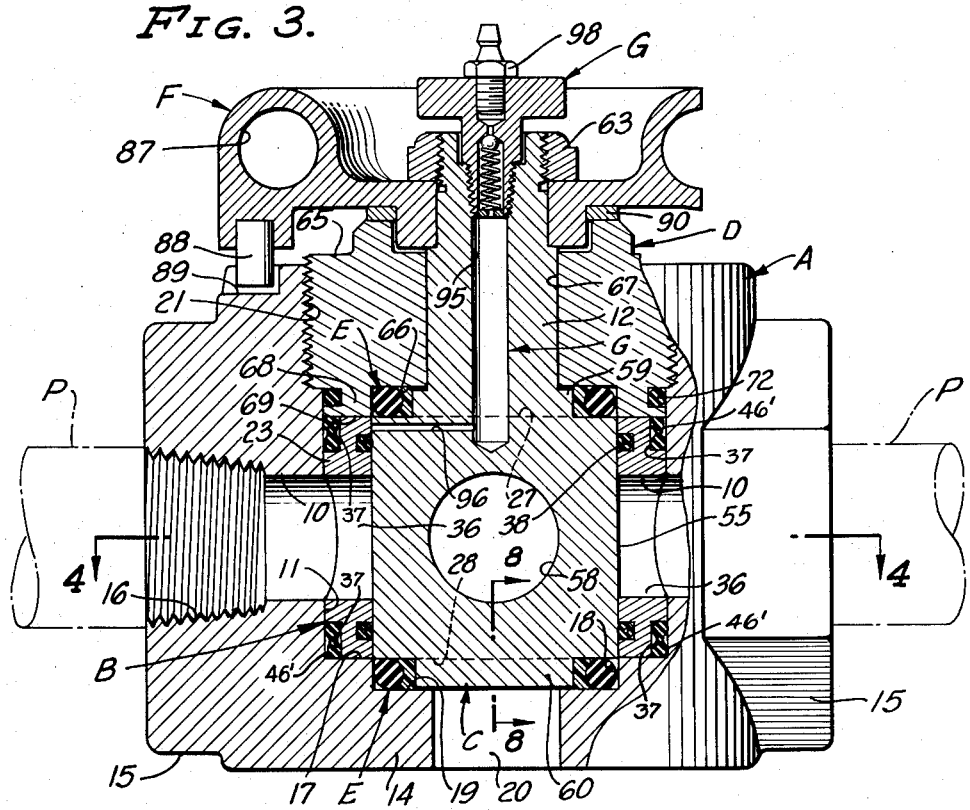
FIG. 3 is a longitudinal sectional view of the valve construction of FIGS. 1 and 2.

The valve construction provided by the present invention is shown as involving generally an elongate horizontally disposed body A having a central longitudinal flow passage 10 (FIGS. 3 and 4) extending therethrough, an upwardly opening valve chamber 11 intersecting the flow passage intermediate its ends, an annular segmental valve seat assembly B engageable in the chamber, a vertically disposed cylindrical valve member C rotatably engaged in the assembly B and having an operating stem 12 projecting upwardly therefrom to the exterior of the body, a keeper ring D threadedly engaged in the upper end of the chamber and freely receiving the stem 12 and adapted to maintain the valve seat assembly B and the valve member C in working position in the body, sealing means E carried by the valve member C to seal with the keeper ring, operating means F fixed to the upper end of the operating stem 12, and grease packing means G related to the valve member C and adapted to facilitate the introduction of grease between the valve member C and the valve seat assembly B and between the said assembly B and the body.

The body A is an elongate horizontally disposed member having an enlarged vertically disposed cylindrical central portion 14, flat top and bottom surfaces and like polygonal end portions 15.

The flow passage 10 extending through the body A is a simple straight cylindrical bore which extends longitudinally through the body from one end to the other. The ends of the flow passage 10 are internally threaded as at 16 to cooperatively receive suitable pipes P or the like.

It is to be understood that in practice, the body A could be provided with pipe flanges or any other suitable type of pipe connecting means as might be desired without in any way affecting the novelty of the present invention.

The valve chamber 11 in the body A is a simple straight bore entering the body from the upper or top end thereof and terminating at a flat bottom 17. The body A is further provided with a first counterbore 18 concentric with the chamber 11 and terminating at a flat bottom 19 and a second counterbore 20 of limited diametric extent concentric with the first counterbore and open to atmosphere at the lower or bottom end of the body.

The upper end of the valve chamber is internally threaded as at 21 and is adapted to threadedly receive the keeper ring D as will be hereinafter described.

The annular valve seat assembly B is shown as including a pair of opposed arcuate support segments 22 and a pair of opposed arcuate seal segments 23, the latter being provided with ports 36 therethrough.

The support segments 22 are identical and each is in the form of an elongate vertically disposed member having arcuate inner and outer surfaces 25 and 26, flat horizontally disposed tops and bottoms 27 and 28, and flat vertically disposed sides 29. The sides 29 are preferably disposed in planes normal to the longitudinal axis of the body A.

Each support segment 22 is provided with a layer 30 of resilient material such as rubber which overlies the outer surface 26 thereof. The layer 30 is preferably bonded to the segment and has upper and lower edges which normally project above and below the top and bottom of the segments a limited distance for a purpose that will be hereinafter described. The layers 30 have smooth arcuate outer surfaces 30' adapted to oppose and seat against the wall of the valve chamber 11 in the body.

The seal segments 23 are identical and each comprises an elongate vertically disposed member having arcuate inner and outer surfaces 31 and 32, flat horizontally disposed tops and bottoms 33 and 34, at flat vertically disposed sides 35. The sides 35 of the seal segments 23 are preferably disposed in a plane normal to the longitudinal axis of the body in butting engagement with the complementary sides 29 of the support segments 22, as clearly illustrated in the drawings.

The ports 36 in the seal segments 23 are circular in cross section and correspond in diameter with the flow passage 10 of the body. Radially outwardly opening seal receiving grooves 37 are formed in the outer surfaces 32 of the seal segments 23 and radially inwardly opening seal receiving grooves 38 are formed in the inner surfaces 31. The grooves 37 and 38 surround the ports 36, each in a square or rectangular pattern. The outer arcuate surfaces 32 of the seal segments 23 are adapted to oppose and seat against the wall of the chamber 11 in the body A.

The rectangular grooves 37 are of considerable width and are each adapted to cooperatively receive a novel sealing ring H. The grooves 37 are shown having flat radially outwardly facing bottoms 39, and radially outwardly projecting inner and outer peripheral side walls 40 and 41. The top and bottom ends of the grooves 37 are open and the top and bottom ends of the seal segments 23 project therefrom as clearly illustrated in FIG. 5 of the drawings. The outer side walls of the grooves are straight vertically disposed walls, coextensive with the vertical extent of the segments 23.

The groves 38 are simple rectangular grooves of uniform cross-section and are each adapted to receive a novel sealing ring I. The grooves 38 have flat radially inwardly facing bottoms 42 and flat inner and outer side walls 43 and 44 projecting radially inward from the bottoms 42.

The novel sealing rings H are substantially rectangular and have horizontally disposed top and bottom portions that extend along the top and bottom portions of the grooves 37 and vertically disposed side portions that extend along the vertical portions of the grooves 37. In cross-sectional configuration, the rings H have round inner portions 45 (FIGS. 5, 6 and 7) about their inner peripheries, rectangular outer portions 46 about their outer peripheries and intermediate web portions 47 extending between and connecting the inner and outer portions 45 and 46. The rings H are formed of a resilient material such as rubber. The inner round portions 45 of the rings H are in the nature of O-ring seals and are adapted to engage the bottoms 39 and the adjacent inner side walls 40 of the grooves 37 and the opposing wall of the chamber 11 in the body A when the structure is assembled.

The outer rectangular portions 46 of the rings H are adapted to seat against the bottoms 39 and the adjacent outer walls 41 of the grooves 37. The outer portions 46 are clear of the wall of the chamber 11 in the body when the construction is assembled as indicated at 46'.

With the relationship of parts set forth above, it will be apparent that the sealing rings H will seal in one direction only, that is the inner O-ring-like portions 45 of the rings will establish a fluid tight seal when urged toward the adjacent inner walls 40 of the grooves 37 by fluid pressure, but will not seal when urged away from said walls 40 of the grooves by fluid pressure. The outer portion 46 and the web portion 47 of the rings H serve to yieldingly urge the inner sealing portions 45 into proper engagement and/or position against the inner walls 40 of the grooves 37 when fluid under pressure is directed upon the said inner portions from the outer peripheral sides thereof, but fail to provide a suitable backing surface for the said inner portions 45 of the rings when fluid under pressure is directed upon the inner peripheral sides thereof.

As a result of the above, the sealing rings H will only seal in one direction, that is, when fluid pressure urges the inner portions 45 thereof against the adjacent sides 40 of the grooves 37.

In the particular case illustrated, the outer edges of the horizontally disposed top and bottom portions of the rings H project from the tops and bottoms of the grooves 37 and above and below the top and bottom ends of the seal segments 23 with which they are related. The purpose of this relationship of parts will be clearly set forth hereinbelow.

The sealing rings I which are engaged in the rectangular inner grooves 38 in the seal segments 23, are in the nature of O-ring seals and are adapted to establish a fluid tight seal between the said seal segments and the plug or valve member C when the construction is assembled.

The rings I are of novel construction and are adapted to be cooperatively engaged in the rectangular grooves 38 in the inner surfaces of the seal segments 23, to normally project therefrom a limited predetermined amount.

The sealing rings I are simple rubber or rubber-like rings of rectangular plan configuration having arcuate horizontally disposed top and bottom portions 48 adapted to be cooperatively received in the top and bottom portions of the grooves 38, and straight vertically disposed side portions 49 adapted to be cooperatively received in the straight side portions of the grooves 38. The several portions of the rings I are round in cross-section and each has a central wire core 50 to prevent the rings from becoming displaced from the grooves in which they are engaged as a result of their own inherent resiliency or elasticity or as a result of the flow of fluid thereacross which would tend to wash them from engagement in the grooves.

It is to be understood that the particular sealing ring constructions H and I set forth above are only typical preferred forms of sealing means that could be advantageously employed in carrying out the present invention and that other, similar sealing rings or means can be employed.

The seal segments 23, with the sealing rings H and I engaged in the grooves therein, are positioned in the chamber 11 of the body A with the ports 36 therein in register with the flow passage 10 in the body. The support segments 22 are then slid into engagement in the chamber 11 of the body A and with the seal segments 23 and so that the several segments cooperate to establish an annular assembly lining the chamber 11 and in which the valve member C is rotatably mounted in sliding relation therewith.

In order to assure proper positioning of the several segments establishing the valve seat assembly B in the body A, and to prevent subsequent circumferential shifting of the assembly in the body, a suitable orienting means J is provided (FIGS. 7 and 8). The means J is shown as including downwardly opening recesses 51 in the bottom surface of each of the support segments 22, and upwardly projecting pins 52 in the bottom of the valve chamber 11 received within the recesses. It will be apparent that the means J serves to maintain the assembly B in proper rotative position in the chamber 11.

It is to be understood that the means J illustrated and described is only typical of one suitable means that can be advantgeously employed.

When the assembly B is engaged in the chamber 11 of the valve body A the valve member C is then slid into engagement in the assembly and establishes sealing engagement with the sealing rings I.

The valve member C is a vertically disposed cylindrical member having a straight cylindrical side wall 55, flat horizontally disposed top and bottom surfaces 56 and 57, and a horizontally disposed flow conducting passage 58 extending transversely therethrough intermediate its ends. The flow passage 58 circular in cross section and corresponds in diametric extent with the flow passage 10 in the body and with the ports 36 in the assembly B.

The valve member C further includes upper and lower cylindrical bosses 59 and 60 concentric with the valve member and projecting from the top and bottom surfaces 56 and 57 thereof. The two bosses 59 and 60 are of the same diameter and each has a straight cylindrical side wall and a flat horizontally disposed end wall.

The lower boss 60 of the member C is adapted to rest or seat on the bottom 19 of the first counterbore 18 in the body and to cover the second counterbore 20, while the upper boss 59 opposes the bottom of the keeper ring D as will hereinafter be described.

The operating stem 12 of the valve member C is a vertically disposed cylindrical member projecting upwardly from the top surface of the upper boss 59. The upper portion of the stem 12 is provided with circumferentially spaced flats 61 about its periphery which are adapted to cooperate and establish driving engagement with the operating means F as described hereinbelow.

The upper terminal end of the operating stem 12 is externally threaded as at 62 to receive a suitable lock nut 63 which serves to maintain the operating means F in proper working engagement with the stem.

The keeper ring D is an externally threaded disc-shaped member having a flat top 65, a flat bottom 66 and a central opening 67 adapted to freely receive the operating stem 12 of the valve member C.

The keeper ring D is further provided with an annular downwardly projecting segment engaging boss 68 having a flat, horizontally disposed bottom face 69 and an upwardly projecting annular boss 70 with a plurality of tool engaging flats 71 about its outer periphery adapted to facilitate advancing the ring D into the upper threaded portion of the valve chamber 11 in the body A.

When the keeper ring D is screwed into the body A toward the segmental seat assembly B, the portions of the resilient layers 30 and of the sealing rings H which project beyond the upper and lower ends of the segments 22 and 23 are compressed axially causing the layers and rings to expand radially inwardly and outwardly and thus to urge the segments 22 and 23 into snug bearing engagement with the valve member C.

In practice, it has been found that the layers 30 and sealing rings H need not be compressed to such an extent that they establish an appreciable pressure on the elements and/or parts related thereto, but only to an extent to prevent excess play and resulting working of the segments of the seat assembly.

By varying the pressure exerted upon the valve member C by the segments of the seat assembly B the turning torque required to operate the valve can be varied if desired and as circumstances require.

In practice, a suitable O-ring seal 72 is provided about the base of the boss 68 on the ring D to seal between the boss and the body and thereby prevent the escape of fluid therebetween.

The sealing means E involves a pair of like, annular seals 75 and 76 engaged about the bosses 59 and 60 of the valve member C. The seal 75 is adapted to seal between the top 56 of the valve member C and the bottom 66 of the keeper ring D, and the seal 76 is adapated to seal between the bottom 57 of the valve member C and the bottom 19 of the first counterbore 18 in the body A.

Each of the seals 75 and 76 is shown as including an inner ring 77 of tough durable plastic material such as nylon, having a radially outwardly opening U-shaped groove about its exterior, and an outer O-ring 78 of flexible material, such as rubber, engaged in the groove in the inner ring.

With the above relationship of parts it will be apparent that the upper and lower ends of the valve member C are suitably sealed with the keeper ring D and the body A, and that the fluid under pressure within the valve tends to urge and/or actuate the seals 75 and 76 into tight pressure and sealing engagement with the parts of the valve assembly related thereto.

In practice, the seals 75 and 76 can vary widely in form and construction, it being understood that the particular seals illustrated and described above are only typical of one preferred form of seal that can be advantageously employed.

It will also be apparent that since the bosses 59 and 60 are of like diameter, and since the seals 75 and 76 related thereto are alike, the valve member C is balanced within the construction and is not urged axially either upwardly or downwardly by the fluid pressure within the housing A.

The operating means F involves a substantially disc-shaped wheel 80 having a central opening 86 therein shaped to receive the upper portion of the operating stem 12 and establish driving engagement with the flats 61 thereon. The wheel 80 is provided with a plurality of circumferentially spaced, tangentially disposed tubular portions 87 about its periphery, each adapted to receive a suitable operating bar. The wheel 80 is retained on the stem by the lock nut 63 threadedly engaged onto the upper terminal end of the stem.

A suitable stop pin 88 is provided on the underside of the operating wheel 80 to engage in an arcuate channel 89 in the top of the body A. The pin 88 serves to limit rotation of the valve member C to 90° and to stop it in either its open or closed position.

An annular felt dust seal 90 is provided between the bottom of the operating wheel 80 and the top of the annular boss 70 at the top of the keeper ring D. The dust seal 90 serves to prevent dust and the like from entering the valve around the operating stem 12.

The grease packing means G includes a longitudinal bore 95 (FIGS. 2 and 3) entering the top of the stem 12 and terminating at a point below the top wall 56 of the valve member C and a lateral port 96 in the upper portion of the valve member and communicating with the lower end of the bore 95.

The means G further includes a suitable grease fitting and check valve assembly 98 threadedly engaged in the upper end of the bore 95 and accessible at the top of the valve assembly. Suitable grease channels 94 (FIGS. 4 and 5) extend across the tops and down the outer surfaces 32 of the seal segments 23 outward of the grooves 39 therein. In operation, grease is forced under pressure through the grease fitting and valve assembly 98 into and through the bore 95 and port 96. The grease enters the space above the valve member C and from there flows through the channels 94 and fills the space between the segments and the wall of the valve chamber and the space below the valve member C. As a result of the above, it will be apparent that a suitable grease seal is established between the body and various elements of the assembly B and between the said assembly and the valve member C.

Due to the sectional nature of the seat assembly B, the grease flows freely through and fully occupies all of the voids throughout the assembly and about the exterior of the valve member C.

In order to allow for the fluid being handled to flow between the several opposing surfaces of the body A, valve seat assembly B and valve member C, and also into the port 58 in the valve member C when the valve is closed, and so that the various elements and/or parts of the construction within the chamber 11 of the body and upstream of sealing rings H and I that are establishing a fluid seal, that is, the sealing rings H and I related to the downstream end of the construction, are in fluid balance or equilibrium, fluid conducting means are provided in the support segments 22 of the valve seat assembly to establish open communication between the inner and outer surfaces thereof. The fluid conducting means referred to is shown as including a radially disposed notch 100 (FIGS. 2a, 6 and 7) in each side 29 of each support side segment 22 intermediate the top and bottom ends thereof and extending through the adjacent side edges of the resilient layer 30. In the preferred carrying out of the invention and as clearly illustrated in FIG. 6 of the drawings, the notches 100 are disposed so as to establish open communication with the port 58 in the valve member C when the valve is in a closed position.

In operation, when the valve is in an open position wherein the passage 58 in the plug or valve member C is in axial alignment with the ports 36 in the seal segments 23 and the flow passage 10 of the body A, fluid is free to flow through the valve assembly.

Figure 4:
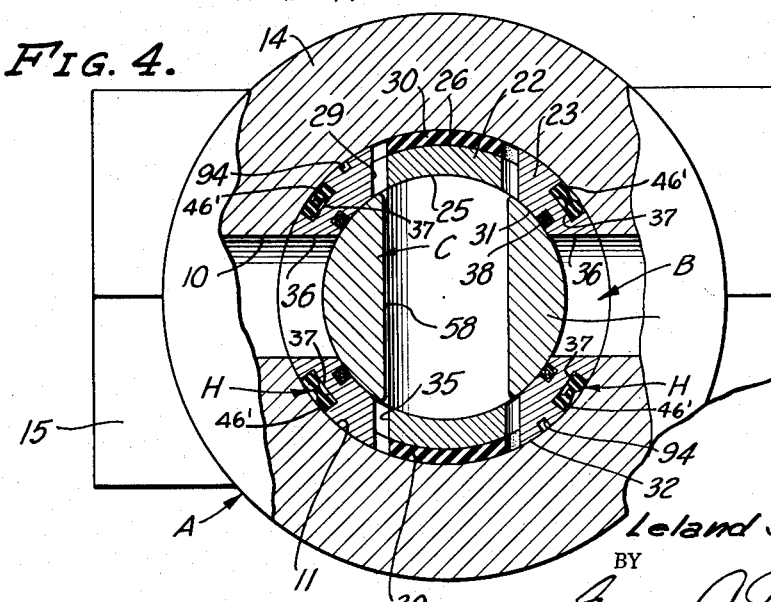
FIG. 4 is a transverse sectional view taken as indicated by line 4—4 on FIG. 3.

When the valve member C is turned 90° to a closed position wherein the passage 58 is out of register with the ports 36 and flow passage 10, as illustrated in FIGS. 3, 4 and 6, and assuming the flow of fluid is in the direction indicated by the arrow W in FIG. 6 of the drawings, fluid is free to flow between the right hand seal segment 23 and the wall of the valve chamber 11 past the sealing ring H carried thereby. Upon passing the upstream sealing ring H as set forth above, the fluid is free to flow through the notches 100 in the support segments 22 to fill the passage 58 in the plug and to continue to flow between the left hand seal segment and the wall of the chamber 11 and to a point where it is positively stopped by the sealing ring H carried by the said left hand seal segment, that is, the downstream sealing ring H.

The sealing rings I carried by seal segments 23 and engaging the side wall 55 of the valve member C, maintain a fluid tight seal therebetween at all times. However, since the main portion of the construction is filled with fluid when the valve is closed, the sealing ring I in the left hand segment, or at the downstream side of the construction is the only ring I that is relied upon to seal.

It is to be understood that in practice, the sealing rings I and the grooves therefor can be eliminated and a ground or polished metal-to-metal seal established between the segments and the valve member.

The like sealing means E at the upper and lower ends of the valve member C serve to prevent the escape of fluid from the valve body A.

With the above relationship of parts, it will be apparent that the fluid pressure is evenly distributed throughout the main part of the valve assembly and that the area of pressure differential defined by the sealing rings H and I at the downstream side of the valve is of limited extent and is so located that it is not subject to becoming distorted or otherwise adversely affected by the pressure encountered.

It will be further apparent that the several segments of the seat assembly, which segments are yieldingly urged into engagement with the valve member C by the resilient sealing rings H and back up layers 30 related thereto, are capable of limited movement relative to each other and to the valve member C and body A, with the result that the mechanism will not bind or stick and is not subject to becoming fouled in such a manner as would prevent its easy operation.

Because of the manner in which the segments 22 and 23 are urged into engagement about the exterior of the valve member C, the valve member C is never shifted out of engagement with the segments. Therefore, foreign matter is never allowed to enter therebetween to adversely affect the operation of the valve. In the case of handling cement, or the like, which is common practice in the oil producing industry, the granular and abrasive matter does not find its way between the seat segments and the valve member C.

In the case of handling cement, or the like, as mentioned above, only the liquid in such material is free to flow about the exterior of the seal segments 23 and to flow through the notches 100 and into the port in the valve member C. This in no way adversely affects the satisfactory operation of the valve. The solid particles carried by the liquid are, in practice, stopped by the seal rings H, thereby preventing the ports from becoming "cemented up."

When the valve member is being rotated and the passage 58 therein passes the straight vertical side portions 49 of the sealing rings I, causing fluid under pressure to be directed across said side portions 49 of the rings I, the rings I cannot be washed out of the grooves 38 due to the fact that the wire core 50 will not allow the said side portions to stretch. Still further, should the side portions of the rings I project from the grooves 38 as is illustrated in FIG. 7 of the drawings, the eliptical edges 101 established at the side wall 55 of the valve member and the wall of the passage 58 in the valve member serve to wipe and feed the rings back into the grooves as the part in the valve member is advanced past the rings. This effect is accomplished because the side portions of the rings are straight and extend in planes normal to the axis of the passage 58 in the valve member while the edges 101 at the ends of the passage are curved, with the result that engagement therebetween is in the nature of progressing point contact rather than line contact occurring at one time along any substantial length of the rings I.

In order to prevent the rings I from being cut by the edges 101 on the valve member, the said edges 101 are rounded, as illustrated in the drawings. It will be apparent that the radius of the edges 101 supplements the wiping action referred to above which serves to urge the rings I back into the grooves 38 should they start to leave the grooves.

The above novel relationship of the rings I with the valve member C can be advantageously incorporated in other plug valve constructions.

It will be apparent that should the body A of the valve swell and stretch as a result of the application of pressure therein, such swelling and/or stretching will in no way affect the satisfactory operation of the valve providing the elastic limit of the material of which the valve body is made is not exceeded.

From the foregoing, it will be apparent that the valve construction of this invention is easy and economical to manufacture and is such that it can be made considerably smaller, lighter and more compact than other plug-type valve constructions of corresponding capacity.

It will be further apparent that when it is desired to rebuild the valve of the present invention, the body need not be removed from the pipe line in which the valve is engaged. All of the parts which are subject to wear and which may need replacement can be easily removed and replaced by simply disconnecting the operating means F from the stem 12 and removing the keeper ring D from the upper end of the valve chamber 11. These two simple operations being completed, the remaining elements of the valve assembly are free to be lifted out of the valve chamber.

Having described only a typical form and application of my invention, I do not wish to be limited or restricted to the specific details herein set forth, but wish to reserve to myself any modifications or variations that may appear to those skilled in the art and fall within the scope of the following claims:

Having described my invention, I claim:

1. A fluid handling valve including, a body having a flow passage extending therethrough, a chamber intersecting the flow passage, a seat assembly including a pair of like ported end segments and a pair of like side segments, said seat assembly engaged in the chamber with the ports of the end segments in register with the flow passage, a back up layer of resilient material between the wall of the chamber and each side segment, a groove in each end segment opposing the wall of the chamber and surrounding the port therein, a resilient sealing ring in the groove in each end segment to seal between the said segment and the wall of the chamber, a plug-like valve member with a fluid passage extending through it engaged in the seat assembly to establish sliding sealing engagement with the segments, and operating means related to the valve member to rotate the valve member and shift the fluid passage therein into and out of register with the ports in the end segments.

2. A fluid handling valve including, a body having a flow passage extending therethrough, a chamber intersecting the flow passage, a seat assembly including a pair of like ported end segments and a pair of like side segments, said seat assembly engaged in the chamber with the ports of the end segments in register with the flow passage, a back up layer of resilient material between the wall of the chamber and each side segment, a groove in each end segment opposing the wall of the chamber and surrounding the port therein, a resilient sealing ring in the groove in each end segment to seal between the said segment and the wall of the chamber, a plug-like valve member with a fluid passage extending through it engaged in the seat assembly to establish sliding sealing engagement with the segments, and operating means related to the valve member to rotate the valve member and shift the fluid passage therein into and out of register with the ports in the end segments, said back up layers serving to yieldingly urge and maintain the seat assembly in engagement about the valve member.

3. A fluid handling valve including, a body having a flow passage extending therethrough, a chamber intersecting the flow passage, an annular seat assembly including a pair of like, arcuate ported end segments and a pair of like, arcuate side segments, said seat assembly engaged in the chamber with the ports of the end segments in register with the flow passage, a back up layer of resilient material between the wall of the chamber and each side segment, a groove in each end segment opposing the wall of the chamber and surrounding the port therein, a resilient, one-way sealing ring in the groove in each end segment to seal between the said segment and the wall of the chamber and prevent the flow of fluid occurring radially outwardly of the groove and ring from flowing radially inwardly and into the port and flow passage related thereto, a plug-like valve member with a fluid passage extending through it engaged in the seat assembly to establish sliding sealing engagement with the segments, and operating means related to the valve member to rotate the valve member and shift the fluid passage therein into and out of register with the ports in the end segments.

4. A fluid handling valve including, a body having a flow passage extending therethrough, a chamber intersecting the flow passage, an annular seat assembly including a pair of like, arcuate ported end segments and a pair of like, arcuate side segments, said seat assembly engaged in the chamber with the ports of the end segments in register with the flow passage, a back up layer of resilient material between the wall of the chamber and each side segment, a groove in each end segment opposing the wall of the chamber and surrounding the port therein, a resilient, one-way sealing ring in the groove in each end segment to seal between the said segment and the wall of the chamber and prevent the flow of fluid occurring radially outwardly of the groove and ring from flowing radially inwardly and into the port and flow passage related thereto, a plug-like valve member with a fluid passage extending through it engaged in the seat assembly to establish sliding sealing engagement with the segments, and operating means related to the valve member to rotate the valve member and shift the fluid passage therein into and out of register with the ports in the end segments, said back up layers serving to yieldingly urge and maintain the seat assembly in engagement about the valve member.

5. A fluid handling valve including, a body having a flow passage extending therethrough, a chamber intersecting the flow passage, an annular seat assembly including a pair of like, arcuate ported end segments and a pair of like, arcuate side segments, said seat assembly engaged in the chamber with the ports of the end segments in register with the flow passage, a back up layer of resilient material between the wall of the chamber and each side segment, a groove in each end segment opposing the wall of the chamber and surrounding the port therein, a resilient, one-way sealing ring in the groove in each end segment to seal between the said segment and the wall of the chamber and prevent the flow of fluid occurring radially outwardly of the groove and ring from flowing radially inwardly and into the port and flow passage related thereto, a plug-like valve member with a fluid passage extending through it engaged in the seat assembly to establish sliding sealing engagement with the segments, and operating means related to the valve member to rotate the valve member and shift the fluid passage therein into and out of register with the ports in the end segments, said back up layers and sealing rings serving to yieldingly urge and maintain the seat assembly in engagement about the valve member.

6. A fluid handling valve including, an elongate horizontally disposed body having a longitudinal flow passage extending therethrough, an upwardly opening cylindrical chamber intersecting the flow passage, an annular seat assembly including a pair of like, elongate, vertically disposed, arcuate ported end segments and a pair of like, elongate, vertically disposed, arcuate side segments, said seat assembly engaged in the chamber with the ports of the end segments in register with the flow passage, a back up layer of resilient material between the wall of the chamber and each side segment, a groove in each end segment opposing the wall of the chamber and open at the upper and lower ends of the segments and surrounding the port therein, a resilient one way sealing ring in the groove in each end segment to seal between the said segment and the wall of the chamber and prevent the flow of fluid occurring radially outwardly of the groove and ring from flowing radially inwardly and into the port and flow passage related thereto, a plug-like valve member with an upwardly projecting operating stem and a fluid passage extending through it engaged in the seat assembly to establish sliding sealing engagement with the segments, an annular follower ring engaged in the upper end of the body and receiving the stem, and operating means related to the operating stem at the exterior of the body to rotate the valve member and shift the fluid passage therein into and out of register with the ports in the end segments.

7. A fluid handling valve including, an elongate horizontally disposed body having a longitudinal flow passage extending therethrough, an upwardly opening cylindrical chamber intersecting the flow passage, an annular seat assembly including a pair of like, elongate, vertically disposed, arcuate ported end segments and a pair of like, elongate, vertically disposed, arcuate side segments, said seat assembly engaged in the chamber with the ports of the end segments in register with the flow passage, a back up layer of resilient material between the wall of the chamber and each side segment, a groove in each end segment opposing the wall of the chamber and open at the upper and lower ends of the segments and surrounding the port therein, a resilient one way sealing ring in the groove in each end segment to seal between the said segment and the wall of the chamber and prevent the flow of fluid occurring radially outwardly of the groove and ring from flowing radially inwardly and into the port and flow passage related thereto, a plug-like valve member with an upwardly projecting operating stem and a fluid passage extending through it engaged in the seat assembly to establish sliding sealing engagement with the segments, an annular follower ring engaged in the upper end of the body and receiving the stem, and operating means related to the operating stem at the exterior of the body to rotate the valve member and shift the fluid passage therein into and out of register with the ports in the end segments, the said layers and sealing rings projecting above the upper and lower ends of the segments, the said follower ring having a downwardly disposed shoulder to engage the said layers and sealing rings to compact them between the wall of the chamber and the segments and thereby urge the segments into yielding pressure engagement in the valve member.

8. A fluid handling valve comprising a body having a flow passage extending therethrough and a chamber intersecting the passage, segmental inserts disposed peripherally within said chamber, opposed edges of adjacent inserts being spaced apart to permit movement of certain of said inserts within the chamber, a cylindrical valve member having a fluid passage extending therethrough, said valve member being rotatable within the body in sliding engagement with said inserts, certain of said inserts having ports in axial alignment with said flow passage and having grooves in their outer surfaces surrounding the ports therein, resilient sealing rings mounted in said grooves to seal between the associated inserts and the wall of said chamber, said sealing rings sealing against flow of fluid from outside the perimeters of said grooves and between the ported inserts and said chamber wall into said ports and yielding to flow of fluid radially outward from said ports between the ported inserts and the chamber wall, said sealing rings serving to yieldingly maintain said ported inserts in pressure bearing engagement with said valve member, and operating means projecting from said body and operable to rotate said valve member to shift the valve member passage into and out of register with said ports.

9. A fluid handling valve comprising a body having a flow passage extending therethrough and a chamber intersecting the flow passage, arcuate segmental inserts disposed circumferentially within said chamber, a valve member having a fluid passage extending therethrough, said valve member being rotatable within the body in sliding engagement with the inserts, certain ones of said inserts having ports in axial alignment with said flow passage, resilient sealing means surrounding said flow passage between said inserts having the ports therein and the wall of said chamber, said sealing means sealing against flow of fluid from outside the perimeters of said sealing means and between the ported inserts and said chamber wall into said flow passage and yielding to flow outward from said ports between said ported inserts and said chamber wall.

10. A fluid handling valve comprising a body having a flow passage extending therethrough and a cylindrical chamber intersecting the body passage, an annular valve seat including a plurality of arcuate segmental inserts disposed circumferentially within said chamber, opposed edges of adjacent inserts being spaced apart to permit limited movement of certain of said inserts within the chamber, a cylindrical valve member rotatable within said valve seat in sliding engagement therewith and having a fluid passage therethrough, said valve seat having ports in axial alignment with said fluid passage, first resilient sealing means between said valve seat and the wall of said chamber and surrounding said ports, said first sealing means being adapted to prevent flow of fluid from outside the perimeters of said first sealing means and between said chamber wall and said valve seat into said ports and yielding to fluid flow outward from said ports between the chamber wall and the valve seat, said first sealing means serving to yieldingly maintain said valve seat in bearing engagement with said valve member, and second resilient sealing means between said valve seat and said valve member and surrounding said ports.

11. A fluid handling valve including a body having a flow passage extending therethrough and a cylindrical chamber intersecting the body flow passage, arcuate segmental inserts disposed circumferentially within said chamber, a vertically disposed cylindrical valve member having a horizontal fluid passage extending therethrough, said valve member being rotatably engaged in said inserts to establish sliding engagement therein, certain ones of said inserts having ports in axial alignment with said flow passage, first resilient sealing means between the ported inserts and the wall of said chamber and surrounding said flow passage, said first sealing means being adapted to seal against flow of fluid from outside the perimeters of said first sealing means and between the ported inserts and said chamber wall into said flow passage and yielding to fluid flow outwardly from the passage between the ported inserts and the chamber wall, said first sealing means serving to yieldingly maintain the associated inserts in bearing engagement with said valve member, second resilient sealing means between said ported inserts and said valve member about said ports, and operating means carried by said valve member and projecting from said body, and operable to rotate said valve member to shift the valve member passage into and out of register with said ports.

12. A fluid handling valve including a body having a flow passage extending therethrough and a chamber intersecting the flow passage, arcuate segmental inserts disposed circumferentially within said chamber, opposed edges of adjacent inserts being spaced apart to permit limited radial movement of certain of said inserts, a valve member rotatable in sliding engagement with said inserts and having a fluid passage extending therethrough, two of said inserts having ports in axial alignment with said flow passage, radially outwardly and radially inwardly disposed grooves in said two inserts about said ports, resilient sealing rings carried in said grooves, said sealing rings in said radially outwardly disposed grooves providing a one-way seal between the ported inserts and said body to prevent fluid flow from outside the perimeters of said sealing rings and between the ported insert and the wall of said body into said ports while yielding to fluid flow outwardly from said ports and serving to yieldingly maintain the associated inserts in bearing engagement with said valve member, and sealing rings surrounding said ports in radially inwardly disposed grooves providing a seal between said ported inserts and said valve member.

13. A fluid handling valve including a body having a horizontal flow passage extending therethrough and a vertically disposed cylindrical chamber intersecting the flow passage, arcuate segmental inserts disposed circumferentially within said chamber, a vertically disposed cylindrical valve member having a horizontal fluid passage extending therethrough, said valve member being rotatably engaged in said inserts, two of said inserts having ports in axial alignment with said flow passage, grooves in the outer surfaces of the ported inserts surrounding said ports, first resilient sealing rings mounted in said grooves to provide a seal between the ported inserts and said body which prevent fluid flow from outside the perimeters of said rings and between the wall of said body and said ported inserts into said ports and which yield to fluid flow radially outward from said ports, said sealing rings yieldingly maintaining the associated inserts in pressure bearing engagement with said valve member, grooves in the inner surfaces of said ported inserts surrounding said ports, second resilient sealing rings in the inner surface grooves sealing between said ported inserts and said valve member, and operating means carried by said valve member and projecting from said body and operable to rotate said valve member to shift the valve member flow passage into and out of register with said ports.

References Cited in the file of this patent

UNITED STATES PATENTS

| | | |
|---|---|---|
| 2,433,732 | Brown | Dec. 30, 1947 |
| 2,614,793 | Storm | Oct. 21, 1952 |
| 2,621,888 | Allen | Dec. 16, 1952 |
| 2,813,695 | Stogner | Nov. 19, 1957 |
| 2,864,580 | Lemoine | Dec. 16, 1958 |
| 2,885,179 | Hartmann | May 5, 1959 |

UNITED STATES PATENT OFFICE
CERTIFICATE OF CORRECTION

Patent No. 3,061,267                                October 30, 1962

Leland S. Hamer

It is hereby certified that error appears in the above numbered patent requiring correction and that the said Letters Patent should read as corrected below.

Column 2, line 1, strike out ", now abandoned".

Signed and sealed this 11th day of May 1965.

(SEAL)
Attest:

ERNEST W. SWIDER
Attesting Officer

EDWARD J. BRENNER
Commissioner of Patents